Dec. 5, 1939.   I. JEPSON ET AL   2,182,083
MIXER MOTOR UNIT
Filed Oct. 6, 1937   3 Sheets-Sheet 1

Inventors:
Ivar Jepson &
Paul A. Chamberlain
By
McCanna, Wintercorn & Morsbach
Attys.

Dec. 5, 1939.  I. JEPSON ET AL  2,182,083
MIXER MOTOR UNIT
Filed Oct. 6, 1937  3 Sheets-Sheet 2
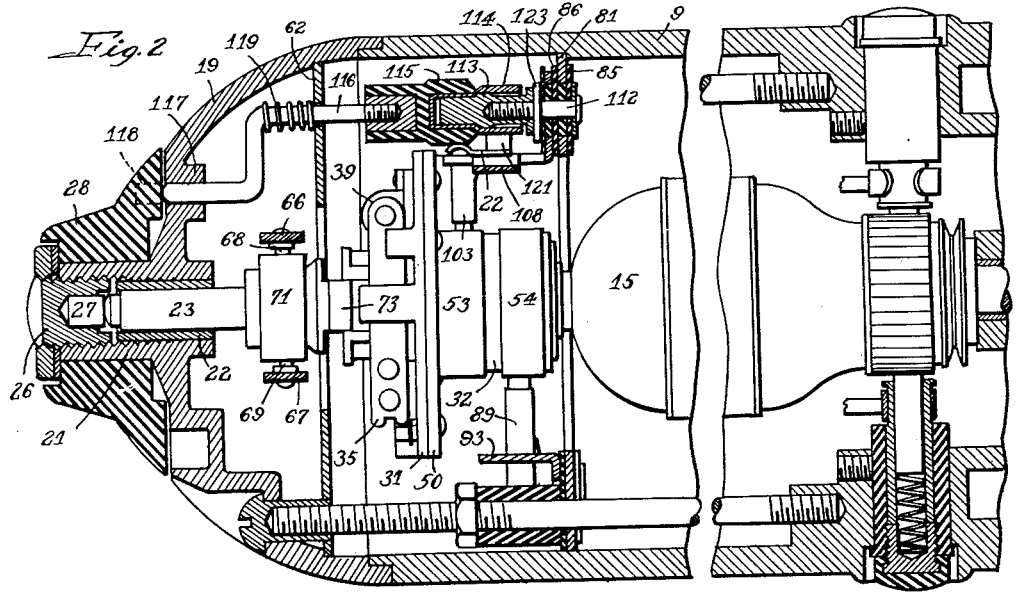
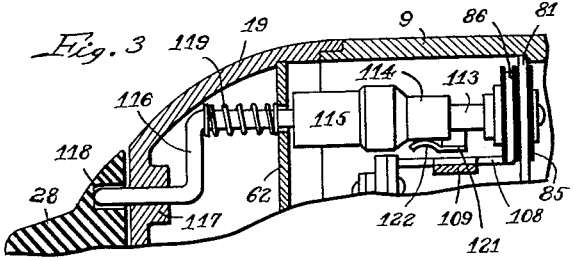
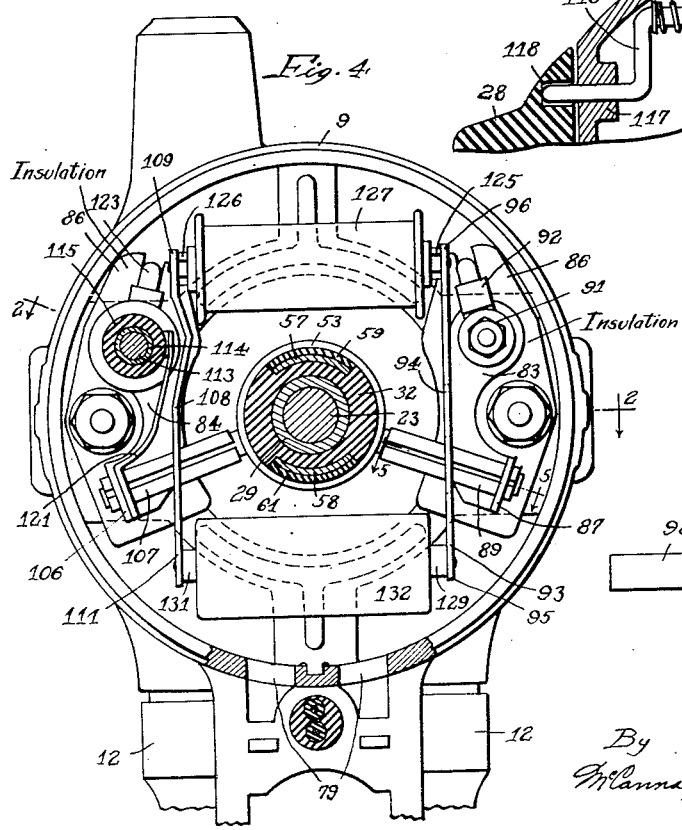
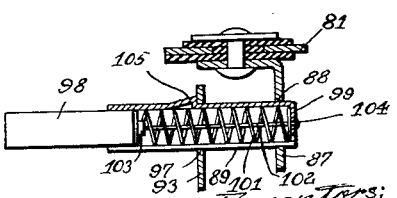

Dec. 5, 1939.　　　I. JEPSON ET AL　　　2,182,083
MIXER MOTOR UNIT
Filed Oct. 6, 1937　　　3 Sheets-Sheet 3

Inventors:
Ivar Jepson &
Paul A. Chamberlain
By
McCanna, Wintercorn & Marhoch
Attys.

Patented Dec. 5, 1939

2,182,083

UNITED STATES PATENT OFFICE 2,182,083

MIXER MOTOR UNIT

Ivar Jepson and Paul A. Chamberlain, Chicago, Ill., assignors to Chicago Flexible Shaft Company, Chicago, Ill., a corporation of Illinois Application October 6, 1937, Serial No. 167,543

4 Claims. (Cl. 171—222)

This invention relates to mixers and has special reference to a motor unit thereof of the type having a handled casing carrying a motor, control means therefor, and spaced spindles adapted to carry and drive beater elements.

An object of the invention is the provision of a mixer motor unit having improved governor mechanism including improved space arrangement of the parts within the casing aimed in general at a compact structure, a more efficient and durable structure, a structure which is efficient to substantially eliminate radio interference.

We have also aimed to provide a mixer motor structure wherein the several elements thereof including the governor member, the governor brushes, the switch and the mounting means therefor have improved structural features which increase the life, decrease the cost, and increase the efficiency of the combination.

Another object of the invention is the provision of a mixer having structure and space arrangement effective to substantially eliminate radio interference.

Other objects and advantages will become apparent from the following description and the accompanying drawings, in which—

Fig. 2 is a section on the line 2—2 of Figure 1;

Fig. 3 is a fragmentary view of Fig. 2 showing a moved position of the switch;

Fig. 4 is a section substantially on the line 4—4 of Figure 1;

Fig. 5 is a section on the line 5—5 of Fig. 4;

Figure 1:
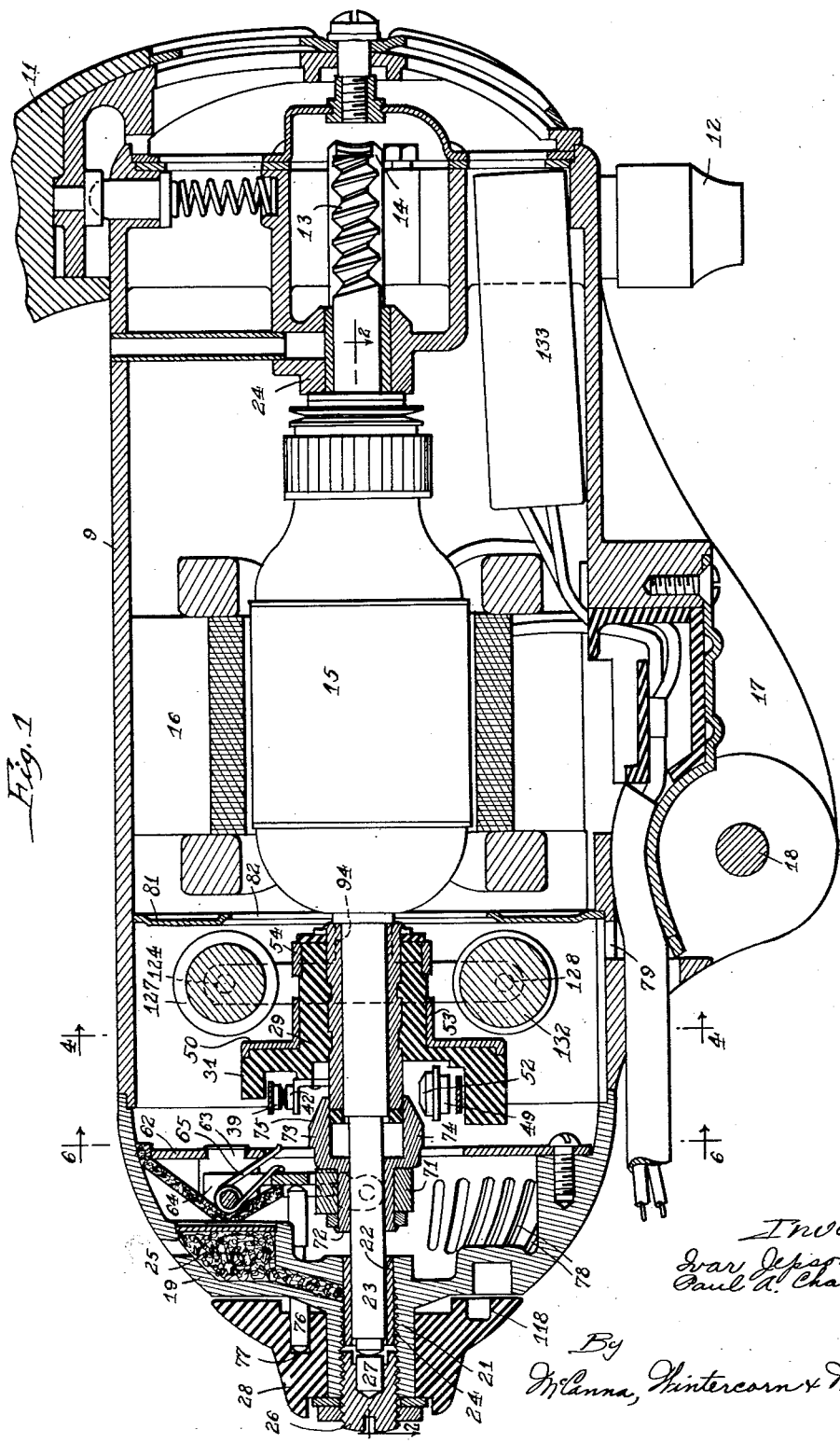
Figure 1 is a longitudinal section taken vertically through a mixer unit embodying our invention.
Figure 6:
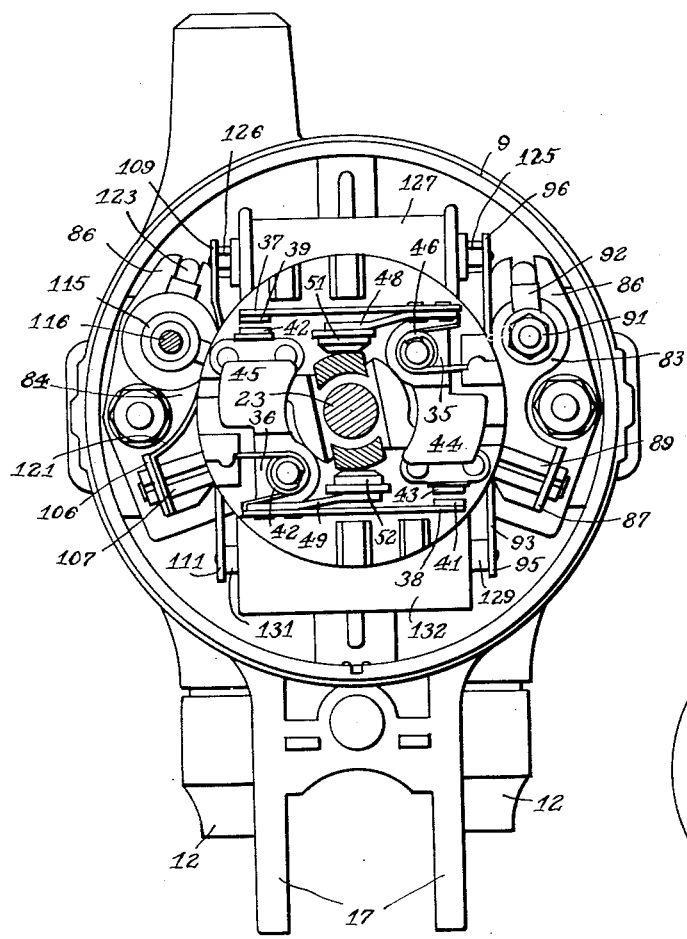
Fig. 6 is a section on the line 6—6 of Figure 1.
Figure 7:
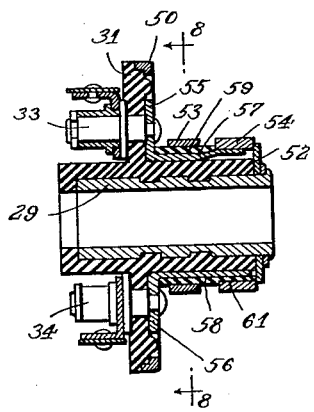
Fig. 7 is a section through the governor frame member.
Figure 8:
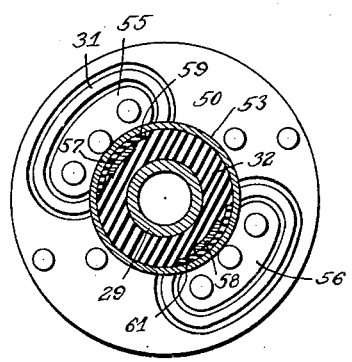
Fig. 8 is a section on the line 8—8 of Fig. 7.
Figure 9:
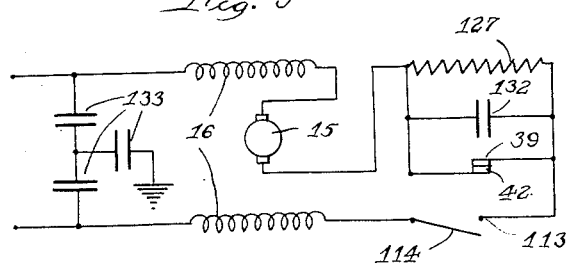
Fig. 9 is a wiring diagram of the mixer.

The invention contemplates a mixer unit of the type having a casing 9 provided preferably with some type of handle, such, for example, as indicated at 11 (Figure 1), the casing carrying spaced dependent spindles 12 driven by a worm 13 engaging worm gears 14 on the spindle, the worm being formed on the forward end of a motor armature 15 cooperating with the usual field members 16. The lower side of the casing has a flange 17 carrying a pin 18 adapted to support the mixer unit on a pedestal in the manner now common in the art. The casing 9 has a cap 19 at the rear thereof closing the back end and providing a bearing sleeve 21 carrying a bushing 22 to provide lateral bearing support for the armature shaft 23. The forward end of the armature shaft 23 is carried in a bushing 24. The bearing sleeve 21 is threaded as shown at 24 to a point well beyond the end of the bushing 22 and the cap 19 is provided with a chamber 25 adapted to hold an oil retaining packing and communicating with the ends of the threads 24, which threads converge and run out on the surface of the sleeve 21, the packing serving to supply lubricant to the threads which gradually works outward along the bushing to lubricate the bearing. A plug 26 is positioned in the end of the bearing sleeve 21 and carries a thrust bearing 27 abutting against the end of the armature shaft 23. Positioned on the outer surface of the bearing sleeve 21 is a control knob 28 adapted to be rotated for the purpose of controlling the switch mechanism and the governor, as will presently more fully appear.

Positioned on the armature shaft 23 between the rear bearing and the armature 15 is a centrifugal governor adapted to control the speed of the motor and adjustable through rotation of the control knob 28 to vary the motor speed. This governor includes a governor frame of insulation material best shown in Figs. 1, 6, 7 and 8, comprising a disk-like portion 31 and a hub 32, the hub having a metal sleeve 29. Pins 33 and 34 are fixed on the disk 31 and pivotally support levers 35 and 36 forming centrifugally operated make and break mechanism substantially similar to that shown in the copending application of Ivar Jepson, Serial No. 24,700, entitled Motor control mechanism. These levers as described in said application have arms 37 and 38 carrying contacts 39 and 41 adapted to cooperate with stationary contacts 42 and 43. The levers also carry weight members 44 and 45 and have springs 46 and 47 normally urging the contacts into engagement. The weight members 44 and 45 under centrifugal force likewise tend to urge the contacts into engagement. The levers also carry arms 48 and 49 provided with insulating buttons 51 and 52 adapted to limit the rotation of the levers 35 and 36 under the action of the weight members 44 and 45 to permit opening of the contacts as described in said application. Means presently to be described are provided for adjusting the limit of travel of the buttons 51 and 52 and thereby adjust the speed of the governor and motor. While current may be supplied to both pairs of contacts, in this instance we have supplied current to only one pair of contacts, the second or opposed mechanism being present for the purpose of imparting dynamic balance to the governor. Contact rings 53 and 54 are positioned on the hub 32 and connector members 55 and 56 are positioned on the face of the disk 31 opposite the levers 35 and 36, the pins 33 and 35 passing through the connector members 55 and 56 and being electrically connected thereto. The connector members 55 and 56 extend along the hub 32 as shown at 57 and 58, the portion 57 being electrically connected to the contact ring 54 and insulated from the contact ring 53 by an insert of insulation material 59. The portion 58 is insulated from both of the contact rings by an insulation insert 61. The contact ring 53 is integral with a metal plate 50 positioned against one face of the disk 31 and is electrically connected to the stationary contacts 42 and 43, whereby when the contacts are closed current flows through the ring 53, the contacts 42 and 39, the arm 37, the pin 33, the connector member 55 and the ring 54.

A partition or frame member 62 is positioned transversely of the casing 9 to the rear of the governor frame member 29 and is provided with an ear 63 arranged to pivotally support an adjusting lever 64, a spring 65 acting between the lever and the partion 62 normally urging the lever in a clockwise direction facing Figure 1. The lever has spaced fingers 66 and 67 provided with pins 68 and 69 engaging in slots of a comb 71. The collar is rotatably positioned on a sleeve 72 having forwardly extending fingers 73 and 74, each provided with a sloping face as shown at 75. The lever 64 and collar 71 serve to hold the sleeve 72 so that the buttons 51 and 52 will engage against the sloping faces 75 and thereby limit the travel of the members 35 and 36. By adjustment of the longitudinal position of the sleeve 75, the amount of this travel may be varied whereby the speed of the motor is varied. A pin 76 is positioned in the cap 19 and projects into a slot 77 of the control knob 28, the slot having a sloping bottom so that by rotation of the control knob 28 the rotative position of the lever 64 may be varied whereby to vary the speed of the motor.

The cap 19 is provided with a plurality of openings 78, and the casing 9 is provided with openings 79 which function to provide a circulation of air through the rear portion of the casing so as to cool the parts, the rotation of the governor serving to cause a forced circulation or movement of air through these openings.

A spider or frame member 81 is positioned transversely of the casing between the governor frame member 29 and the armature 15 and has a relatively large central opening 82 for the passage of air. This spider may advantageously be of relatively thin rigid sheet metal and serves as a frame structure for the support of various electrical elements of the device. Brackets of electrically conductive material 83 and 84 are positioned on the spider 81 on opposite sides of the hub portion 32 as best shown in Fig. 4, and are insulated from the spider by sheets of insulation material 85 and 86 on opposite sides of the spider. The bracket 83 has an upstanding flange 87 provided with an opening 88 for the reception of one end of a brush holder 89 presently to be more fully described. The bracket 83 also has a binding post 91 to which is attached a lead 92 for conducting current to the motor. The bracket 83 also has a flange 93 in the form of a relatively long strip of conductive material integral with the bracket through a relatively narrow attaching portion 94 intermediate the ends of the flange to provide free upwardly and downwardly extending end portions 95 and 96. The flange 93 is likewise provided with an opening 97 for the reception of the brush holder 89. The brush holder 89 is formed by bending a flat sheet into a tube of rectangular cross-section of such size as to receive a conventional brush 98, one end of the tube being bent inward to provide an end portion 99. A spring 101 is positioned in the brush holder for urging the brush outwardly, and a strip of thin ribbon of electrically conductive material 102 is fixed in the end of the brush as shown at 103 and is soldered or otherwise attached to the end 99 as shown at 104 so as to limit the outward travel of the brush in the holder, and also provide a positive electrical path from the holder to the brush. The brush holder has a shoulder 105 adapted to abut against the bracket 93 so as to limit the travel of the brush holder to the right facing Fig. 5. It will be seen that with this construction the brush holder need simply be slipped into the holes or openings 89 and 97 and no other means of attachment need be provided since the shoulder 105 limits the inward movement, and when assembled contact with the brush 98 against the ring 93 or 94 effectively limits movement in the opposite direction. The brush holder 89 and its supports are so positioned that the brush 98 will bear against the ring 54 to establish electrical connection therewith.

The bracket 84 has a flange 106 similar to the flange 97 of the bracket 83 carrying a brush holder 107 identical with the brush holder 89. The bracket likewise has a flange 108 similar to the flange 93 also provided with upwardly and downwardly extending ends 109 and 111. Positioned on the bracket 84 and extending through the spider 81 is a screw 112 arranged to carry switch mechanism comprising an outwardly extending pin 113 of metal. Positioned on the pin 113 for sliding movement thereon is a sleeve 114 having a press fit in a block of insulation 115 carried on an actuating pin 116 extending through the partition 62 and having bearing support thereon, the pin also extending through a boss 117 of the cap 19 and into a recess 118 of the actuating knob 28, the recess being so arranged that in one extreme rotative position of the knob 28 the pin 116 is forced inward against the tension of a spring 119 to the position shown in Fig. 2. A spring switch lever 121 is attached to the bracket 106 and extends upwardly to a point adjacent the sleeve 114 and has a contact portion 122 positioned to be engaged by the insulation block 115 when the pin 116 is forced inwardly as shown in Fig. 2, and to engage the sleeve 114 when the pin moves into the slot 118 to close contact between the bracket 84 and the sleeve 114. An electric conductor 123 is connected to the screw 112 which is insulated from the spider 81 and the bracket 84.

The upstanding ends 96 and 109 of the flanges 93 and 108 are provided with openings 124 for the reception of the contact ends 125 and 126 of a resistor 127 of the cartridge type. Likewise the downwardly extending ends 95 and 111 of the flanges are provided with openings 128 for the reception of the contact ends 129 and 131 of a condenser 132. A condenser 133 positioned in the forward end of the motor also functions in the electrical circuit.

Attention is directed to the fact that the resistor 127, the condenser 132, and the brush holders 89 and 107 are all carried on the same two brackets. In other words, the bracket 83 supports one end of the resistor and of the condenser and intermediate these points of support carries the brush holder 89. The brackets are likewise carried on the spider 81 together with the switch mechanism. This construction accomplishes two important purposes. One of these is to support the resistor and the condenser in as close proximity to the source of radio disturbance as is possible, and the second purpose is to carry these elements in a very condensed space necessitated by the very small space within the casing 9. It will be seen that through this arrangement the brushes, the resistor and the condenser 132 are carried in a single plane which includes the hub 32 of the governor. Thus the brush holders 89 and 107 are supported on the same conductor and intermediate the adjacent ends of the resistor and the condenser. This not not only makes for compactness and simplicity, but results in maximum efficiency in reducing radio interference occasioned by the brushes and the contact rings. The fact that all of the electrical parts positioned rearwardly of the motor, aside from the centrifugal contact mechanism per se are carried in the plane of the hub portion, including the resistor 127, the condenser 132, the brushes and the switch mechanism, materially reduces the cost of material and simplifies the assembly operations.

A further advantage of the mixer construction is that the rear bearing is located in the cap 19 permitting of improved bearing construction and improved lubrication thereof as heretofore described.

Attention is also directed to the construction of the centrifugal governor member and the arrangement of the contact rings and other conductors on the governor frame member providing a construction of greater simplicity, lower manufacturing cost and improved efficiency. We have also provided an improved brush construction cooperating with the brush holding brackets and with the rings in a novel and efficient fashion.

While we have thus described and illustrated a specific embodiment of the invention, we are aware that numerous alterations and changes may be made within the spirit of the invention, but we do not wish to be limited except as required by the prior art and the scope of the appended claims.

We claim:

1. The combination in a motor driven household appliance of a motor having an armature and an armature shaft, centrifugal governor means for the motor comprising a frame member positioned on said shaft adjacent the armature having at least a pair of relatively movable centrifugally operated contacts for controlling the flow of current to the motor, and a cylindrical hub portion provided with at least a pair of spaced contact rings, said contacts and rings being conductively connected, brackets of electrically conductive material on opposed sides of said shaft in the plane of said hub portion, said brackets having resilient supporting flanges provided intermediate their ends with a slot, a resistor conductively supported on and between said flanges at one end thereof, a condenser conductively supported on and between said flanges at the opposite ends thereof, said brackets having a second flange, said second flange having a slot, and brush mechanism for engaging said rings comprising brush holders received in said slots for lateral support and conductive contact, the holders having means for abutting one of said flanges to limit movement thereof radially away from the rings, brushes in said holders, and means acting between the brushes and the holders to urge the brushes against the rings and the holders into said slots.

2. The combination in a motor driven household appliance of a motor having an armature and an armature shaft, centrifugal governor means for the motor comprising a frame member positioned on said shaft adjacent the armature having at least a pair of relatively movable centrifugally operated contacts for controlling the flow of current to the motor, and a cylindrical hub portion provided with at least a pair of spaced contact rings, said contacts and rings being conductively connected, brackets of electrically conductive material on opposed sides of said shaft in the plane of said hub portion, said brackets having resilient supporting flanges provided intermediate their ends with a slot, a resistor conductively supported on and between said flanges at one end thereof, a condenser conductively supported on and between said flanges at the opposite end thereof, said brackets having a second flange, said second flange having a slot, and brush mechanism for engaging said rings comprising brush holders received in said slots for lateral support and conductive contact, the holders having means for abutting one of said flanges to limit movement thereof radially away from the rings, brushes in said holders, and means acting between the brushes and the holders to urge the brushes against the rings and the holders into said slots, and switch means carried on one of said brackets comprising a pin of conductive material adapted to be connected to a source of power and insulated from said bracket, a spring pressed switch lever on said bracket positioned to engage said pin to close a circuit through said pin and said bracket and a sleeve of insulation material on said pin supported for normal movement on the pin to a position between the pin and lever to open the circuit.

3. The combination in a motor driven household appliance, of a centrifugal governor mechanism comprising a governor frame having a cylindrical hub portion of insulation material, a metal liner therefor for attachment to the motor shaft, an outwardly extending annular flange of insulation material intermediate the ends of said hub integral therewith, a metal plate secured against one side of said flange and extending along said hub to provide a contact ring thereon, a metal contact ring spaced from the first mentioned ring, a recess in said hub extending beneath the first mentioned ring, a metal conductor seated in said recess and electrically connected to the second mentioned ring and through said flange, and a strip of insulation in said recess between said conductors and the first mentioned ring, at least a pair of relatively movable centrifugally operated contacts on the face of said flange opposite said metal plate electrically connected to the plate and the conductor, and electrically conductive brushes positioned to engage said rings.

4. The combination in a centrifugally operated governor, of a governor frame comprising a cylindrical hub portion of insulation material having slots on the periphery thereof extending longitudinally of the hub portion, an outwardly extending annular flange of insulation material intermediate the ends of said hub and integral therewith, a metal liner for said hub arranged for attachment to a shaft, a metal plate secured across one side of said flange substantially coextensive therewith and extending along said hub adjacent the flange to provide a contact ring thereon, said plate having openings communicating with said recesses, a metal contact ring spaced on said hub from the first mentioned ring, metal conductors each having a portion seated in the openings in said metal plate, against said flange and in spaced relation to the periphery of said openings for insulation therefrom and having a portion seated in one of said recesses, and a strip of insulation in each of said recesses between said conductor and the first mentioned ring, to insulate the conductor therefrom.

IVAR JEPSON.
PAUL A. CHAMBERLAIN.